(12) United States Patent
Murakami et al.

(10) Patent No.: US 10,335,728 B2
(45) Date of Patent: Jul. 2, 2019

(54) FILTER MEDIUM FOR AIR FILTER, FILTER PACK, AND AIR FILTER UNIT

(71) Applicant: DAIKIN INDUSTRIES, LTD., Osaka (JP)

(72) Inventors: Chizuru Murakami, Osaka (JP); Satoshi Hara, Osaka (JP); Tatsumi Sakano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/751,128

(22) PCT Filed: Jul. 27, 2016

(86) PCT No.: PCT/JP2016/072089
§ 371 (c)(1),
(2) Date: Feb. 7, 2018

(87) PCT Pub. No.: WO2017/026289
PCT Pub. Date: Feb. 16, 2017

(65) Prior Publication Data
US 2018/0236392 A1    Aug. 23, 2018

(30) Foreign Application Priority Data

Aug. 7, 2015   (JP) ................. 2015-157738

(51) Int. Cl.
*D04H 3/05*   (2006.01)
*B01D 39/16*  (2006.01)
(Continued)

(52) U.S. Cl.
CPC ........... *B01D 46/521* (2013.01); *B01D 39/16* (2013.01); *B01D 39/1623* (2013.01);
(Continued)

(58) Field of Classification Search
CPC .. B01D 46/16; B01D 46/1623; B01D 46/521; B01D 2239/1233; B01D 2239/1291; D04H 1/4382; D04H 3/016
See application file for complete search history.

(56) References Cited

U.S. PATENT DOCUMENTS

| 5,582,907 | A | * | 12/1996 | Pall | ................... | B01D 39/1623 |
|---|---|---|---|---|---|---|
| | | | | | | 428/304.4 |
| 2008/0318024 | A1 | * | 12/2008 | Angadjivand | ..... | B01D 39/1623 |
| | | | | | | 428/311.51 |

(Continued)

FOREIGN PATENT DOCUMENTS

| EP | 2 224 042 A2 | 9/2010 |
|---|---|---|
| JP | S50-46972 A | 4/1975 |

(Continued)

OTHER PUBLICATIONS

International Search Report issued in corresponding International Application No. PCT/JP2016/072089 dated Oct. 11, 2016, with translation (7 pages).

(Continued)

*Primary Examiner* — Jason M Greene
(74) *Attorney, Agent, or Firm* — Osha Liang LLP (57) ABSTRACT

Provided are a filter medium for an air filter capable of having extended life even when composed of embossable material. The filter medium (1) has a tensile elongation of 10% or greater, and includes a main collection layer (30) having a filing rate of 5% to 15%, a thickness of 0.35 mm to 0.70 mm, and a peak in a fiber diameter distribution at less than 1.0 μm and a peak at 1.0 μm or greater. An average fiber diameter of small fiber diameters of less than 1.0 μm is from 0.1 μm to less than 0.8 μm, and an average fiber diameter of large fiber diameters of 1.0 μm or greater is from 1.2 μm to less than 3.0 μm. A volume ratio of the fibers having the (Continued)

small fiber diameter to the fibers having the large fiber diameter is from 30:70 to 80:20.

17 Claims, 3 Drawing Sheets

(51) Int. Cl.
    *B01D 46/00*         (2006.01)
    *B01D 46/52*         (2006.01)
    *D04H 3/007*        (2012.01)
    *D04H 3/016*        (2012.01)
    *D04H 1/4382*      (2012.01)

(52) U.S. Cl.
    CPC ......... *B01D 46/0005* (2013.01); *B01D 46/52* (2013.01); *D04H 1/4382* (2013.01); *D04H 3/007* (2013.01); *D04H 3/016* (2013.01); *D04H 3/05* (2013.01); *B01D 2239/1233* (2013.01); *B01D 2239/1291* (2013.01)

(56) References Cited

U.S. PATENT DOCUMENTS

| | | | |
|---|---|---|---|
| 2009/0117803 A1* | 5/2009 | Jung | B01D 39/1623 442/344 |
| 2010/0219138 A1* | 9/2010 | Scheerlinck | B01D 39/1623 210/767 |
| 2010/0285101 A1 | 11/2010 | Moore et al. | |
| 2014/0165515 A1* | 6/2014 | Matsuda | D04H 3/016 55/482 |
| 2016/0199766 A1* | 7/2016 | Motomura | B01D 39/1623 55/467 |
| 2016/0288033 A1* | 10/2016 | Reyinger | B01D 39/1623 |
| 2017/0233911 A1* | 8/2017 | Wang | B01D 39/1623 442/351 |
| 2018/0236392 A1 | 8/2018 | Murakami et al. | |

FOREIGN PATENT DOCUMENTS

| | | |
|---|---|---|
| JP | H11-131353 A | 5/1999 |
| JP | 3753522 B2 | 3/2006 |
| JP | 2008-049333 A | 3/2008 |
| JP | 2009-209456 A | 9/2009 |
| JP | 2009-531554 A | 9/2009 |
| JP | 2009-545681 A | 12/2009 |
| JP | 2010-185154 A | 8/2010 |
| JP | 2012-020274 A | 2/2012 |
| JP | 2013-052320 A | 3/2013 |
| JP | 5362561 B2 | 12/2013 |
| JP | 2014-184360 A | 10/2014 |
| JP | 2016-123972 A | 7/2016 |
| JP | 2017-035684 A | 2/2017 |
| JP | 2017-051953 A | 3/2017 |
| WO | 2008/016790 A1 | 2/2008 |

OTHER PUBLICATIONS

Notification of Reasons for Refusal issued in corresponding Japanese Patent Application No. 2016-147301 dated Oct. 4, 2016, with translation (4 pages).
Decision to Grant a Patent issued in corresponding Japanese Patent Application No. 2016-147301 dated Jan. 17, 2017, with translation (6 pages).
Notification of Reasons for Refusal issued in corresponding Japanese Patent Application No. 2016-235690 dated Aug. 29, 2017, with translation (4 pages).
Decision to Grant a Patent issued in corresponding Japanese Patent Application No. 2016-235690 dated Nov. 21, 2017, with translation (6 pages).
Written Opinion of the International Searching Authority issued in corresponding International Application No. PCT/JP2016/072089 dated Oct. 11, 2016, with translation (7 pages).
International Preliminary Report on Patentability issued in corresponding International Application No. PCT/JP2016/072089 dated Feb. 22, 2018 (6 pages).
U.S. Naval Research Laboratory; AD213367, Report No. 5265; Feb. 11, 1959 (12 pages).
R. Buntin et al; "Melt Blowing—A One-Step Web Process for New Nonwoven Products"; Tappi Journal, vol. 56, No. 4, pp. 74-77; Apr. 1973 (4 pages).
Extended European Search Report in counterpart European Application No. 16 83 4986.8 dated Apr. 30, 2018 (7 pages).

* cited by examiner

FILTER MEDIUM FOR AIR FILTER, FILTER PACK, AND AIR FILTER UNIT

TECHNICAL FIELD

One or more embodiments of the invention relate to a filter medium for an air filter, a filter pack, and an air filter unit.

BACKGROUND

Various medium-performance air filter media have been disclosed. Examples thereof include a glass filter medium made from glass fibers recited in Japanese Laid-open Patent Publication No. 2008-049333 (Patent Literature 1).

SUMMARY OF THE INVENTION

In order to increase filter medium area, a filter medium for an air filter is formed into a zig-zag shape by pleating the filter medium with mountain folds and valley folds in an alternating manner, and then attached to a frame. The resulting product can then be used as an air filter unit.

In this case, it is preferable that spaces (pleat spaces) between adjacent mountain fold portions or valley fold portions of the filter medium incorporated into the air filter unit are maintained as much as possible, even when subjected to air pressure during use, in order to secure pathways for air flow.

An example of a method for maintaining the pleat spaces includes forming convexities, by embossing, on each of two opposing surfaces that face each other as a result of the mountain folding and valley folding, and bringing the convexities into contact with each other.

However, the embossed convexities are formed, for example, by sandwiching and pressing the filter medium between a pair of dies. In this case, each die of the pair has a plurality of concavo-convexities formed on the surface thereof. Accordingly, embossing is problematic for cases where the filter medium is made from hard or brittle material such as a conventional glass filter medium made from glass fibers. This is because the layer structure is easily destroyed and crushed by the embossing.

One or more embodiments of the invention provide a filter medium for an air filter, a filter pack, and an air filter unit for which life can be extended even when composed of an embossable material.

A filter medium for an air filter according to one or more embodiments of the invention includes a main collection layer. The main collection layer has a filing rate of from 5% to 15%. The main collection layer has a thickness of from 0.35 mm to 0.70 mm. The main collection layer has a peak at less than 1.0 μm and a peak at 1.0 μm or greater in a fiber diameter distribution. The main collection layer includes fibers having a small fiber diameter of less than 1.0 μm with an average fiber diameter of 0.1 μm to less than 0.8 μm. The main collection layer includes fibers having a large fiber diameter of 1.0 μm or greater with an average fiber diameter of 1.2 μm to less than 3.0 μm. A volume ratio of the fibers having the small fiber diameter to the fibers having the large fiber diameter, that is, the fibers having the small fiber diameter: the fibers having the large fiber diameter, is from 30:70 to 80:20, inclusive. The filter medium for the air filter has a tensile elongation of 10% or greater.

Here, the volume ratio of the fibers having the small fiber diameter to the fibers having the large fiber diameter is set to be within the numerical range of the volume ratio described above at any position from upstream to downstream in an airflow passing direction of the main collection layer.

The tensile elongation of the filter medium for the air filter being 10% or greater results in the fibers being less likely to be destroyed, even when the filter medium for the air filter is embossed to form convexities. Additionally, with the filter medium for the air filter, the filing rate of the main collection layer is from 5% to 15% and the thickness of the main collection layer is from 0.35 mm to 0.70 mm. This configuration makes it possible to achieve so-called medium-performance (70% or greater) collection efficiency. The main collection layer of the filter medium for the air filter is sufficiently thin with the thickness being from 0.35 mm to 0.70 mm. As such, the filter medium for the air filter can be easily pleated using mountain folds and valley folds (the filter medium for the air filter can be easily pleated even when an air-permeable support material is used).

Under the assumptions described above, the main collection layer of the filter medium for the air filter has, in the fiber diameter distribution, a peak at less than 1.0 μm and a peak at 1.0 μm or greater. In addition, not only do the small fiber diameters and the large fiber diameters each have a specific geometric mean, but the percentages of the volume ratio of the fibers having the small fiber diameter to the fibers having the large fiber diameter are set to a specific balance in the main collection layer. As a result of this configuration, the filter medium is less likely to become clogged, and the life thereof can be extended (dust holding capacity will increase).

A filter medium for an air filter according to one or more embodiments of the invention includes an upstream collection layer and a main collection layer. The main collection layer is disposed downstream side of the upstream collection layer in an airflow. The filter medium for the air filter has a tensile elongation of 10% or greater. When air containing NaCl particles with a particle size of 0.4 μm is passed through the upstream collection layer at a flow rate of 5.3 cm/sec, the upstream collection layer has a collection efficiency of the particles of 5% to 50%. The upstream collection layer has a thickness of 0.15 mm to 0.45 mm. The upstream collection layer has one peak in a fiber diameter distribution. The upstream collection layer has an average fiber diameter of 1.0 μm to 2.0 μm. The main collection layer has a filing rate of 5% to 15%. The main collection layer has a thickness of 0.26 mm to 0.56 mm. The main collection layer has a peak at less than 1.0 μm and a peak at 1.0 μm or greater in a fiber diameter distribution. The main collection layer includes fibers having a small fiber diameter of less than 1.0 μm with an average fiber diameter of 0.1 μm to less than 0.8 μm. The main collection layer includes fibers having a large fiber diameter of 1.0 μm or greater with an average fiber diameter of 1.2 μm to 3.0 μm. A volume ratio of the fibers having the small fiber diameter to the fibers having the large fiber diameter, that is, the fibers having the small fiber diameter: the fibers having the large fiber diameter, is from 30:70 to 80:20, inclusive.

Here, the volume ratio of the fibers having the small fiber diameter to the fibers having the large fiber diameter is set to be within the numerical range of the volume ratio described above at any position from upstream to downstream in an airflow passing direction of the main collection layer.

The tensile elongation of the filter medium for the air filter being 10% or greater results in the fibers being less likely to be destroyed, even when the filter medium for the air filter is subjected to embossing to form convexities. Additionally, in this filter medium for the air filter, the specific upstream collection layer for which the collection efficiency is from 5% to 50%, the thickness is from 0.15 mm to 0.45 mm, and the average fiber diameter is from 1.0 μm to 2.0 μm is used in combination with the main collection layer for which the filing rate is from 5% to 15% and the thickness is from 0.15 mm to 0.45 mm. This configuration makes it possible to achieve so-called medium-performance (70% or greater) collection efficiency. The filter medium for the air filter is configured sufficiently thin with the thickness of the upstream collection layer being from 0.15 mm to 0.45 mm and the thickness of the main collection layer being from 0.26 mm to 0.56 mm. As such, the filter medium for the air filter can be easily pleated using mountain folds and valley folds (the filter medium for the air filter can be easily pleated even when an air-permeable support material is used).

Under the assumptions described above, the filter medium for the air filter has, in the fiber diameter distribution, a peak at less than 1.0 μm, and a peak at 1.0 μm or greater. In addition, not only do the small fiber diameters and the large fiber diameters each have a specific geometric mean, but the percentages of the volume ratio of the fibers having the small fiber diameter to the fibers having the large fiber diameter are set to a specific balance in the filter medium. As a result of this configuration, the filter medium is less likely to become clogged, and the life thereof can be extended (the dust holding capacity can be increased).

A filter medium for an air filter according to one or more embodiments of the invention is the filter medium for the air filter according to any one of the embodiments described above, wherein the fibers having the small fiber diameter has a geometric standard deviation for the diameters of 3.0 or less, and the fibers having the large fiber diameter has a geometric standard deviation for the diameters of 3.0 or less.

This configuration makes it possible to further extend the life of the filter medium for the air filter.

A filter medium for an air filter according to one or more embodiments of the invention is the filter medium for the air filter according to any one of the embodiments described above, wherein a pressure drop, when air is passed through the filter medium for the air filter at the flow rate of 5.3 cm/sec, is from 30 Pa to 55 Pa. Additionally, when air containing NaCl particles with a particle size of 0.4 μm is passed through the filter medium for the air filter at the flow rate of 5.3 cm/sec, the collection efficiency of the particles of the filter medium for the air filter is 75% or greater. Furthermore, when air containing polyalphaolefin particles with a number median size of 0.25 μm is continuously blown through the filter medium for the air filter at the flow rate of 5.3 cm/sec, and the pressure drop rises by 250 Pa, the dust holding capacity of the polyalphaolefin particles of the filter medium for the air filter is 5 g/m$^2$ or greater.

This configuration makes it possible to extend the life of the filter medium for the air filter having medium-performance.

A filter medium for an air filter according to one or more embodiments of the invention is the filter medium for the air filter according to any one of the embodiments described above, wherein the filter medium for the air filter includes one or two or more selected from the group consisting of polypropylene, polybutylene terephthalate, polyamide, polyethylene terephthalate, and polyethylene.

With this configuration, it is possible to extend the life of the filter medium for the air filter using general-purpose materials.

A filter medium for an air filter according to one or more embodiments of the invention is the filter medium for the air filter according to any one of the embodiments described above, wherein the main collection layer includes more of the fibers having the small fiber diameter in a downstream side half of the main collection layer than in an upstream side half of the main collection layer in the airflow passing direction.

In this case, it is possible to ascertain if more of the fibers having the small fiber diameter are present in the downstream half than in the upstream half in the airflow passing direction by using an electron microscope to observe arbitrary locations in the upstream half and the downstream half of the main collection layer, and counting the number of the fibers having the small fiber diameter (fibers having a fiber diameter of less than 1.0 μm) present per unit volume.

With this configuration, clogging is less likely to occur upstream in the airflow and, as such, it is possible to further extend the life of the filter medium for the air filter.

A filter pack according to one or more embodiments of the invention includes the filter medium for the air filter according to any one of the embodiments described above. The filter medium for the air filter includes a plurality of convexities protruding in a thickness direction of the filter medium for the air filter. The filter pack is configured with the filter medium for the air filter of a zig-zag shape that has alternative repeated mountain folds and valley folds.

Note that, while not limiting, the "filter pack" is not a flat sheet-like article. Rather, the filter pack can be an article of the zig-zag shape that is formed by making alternating mountain folds and valley folds, and shaped so as to be capable of being accommodated in a desired frame.

The filter pack has the plurality of convexities located on the filter medium for the air filter and protruding in the thickness direction. This configuration of the zig-zag shape with the alternative mountain folds and valley folds makes it easier to secure the space between adjacent surfaces of the filter pack. As a result, deformation of the filter pack due to wind pressure during use can be reduced, allowing the performance to be demonstrated in a satisfactory manner.

An air filter unit according to one or more embodiments of the invention includes the filter medium for the air filter according to any one of the embodiments described above or the filter pack according to the embodiments described above, and a frame holding the filter medium for the air filter or the filter pack.

The filter medium for the air filter, the filter pack, and the air filter unit according to one or more embodiments of the present invention are capable of being extended life even when composed of an embossable material.

DESCRIPTION OF EMBODIMENTS

The present invention is described hereinafter using embodiments as examples, but the present invention should not be construed as being limited to these embodiments.

Embodiments are described as examples hereinafter for a filter medium for an air filter (hereinafter also referred to simply as "filter medium"), a filter pack, an air filter unit, and a method for manufacturing the filter medium for the air filter.

(1) Filter Media for Air Filter

Figure 1:
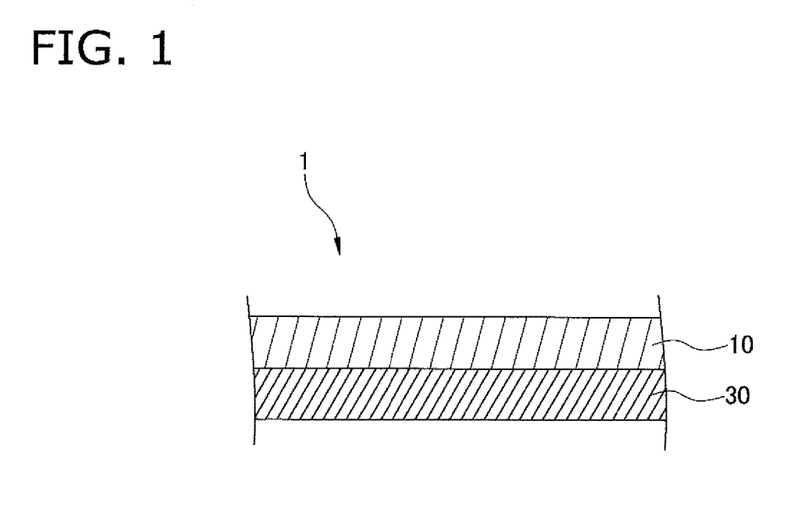
FIG. 1 is a schematic cross-sectional view illustrating a layer structure of a filter medium for an air filter according to one or more embodiments of the present invention.

FIG. 1 is a schematic cross-sectional view of a filter medium for an air filter 1 according to one or more embodiments.

The filter medium for the air filter 1 is a filter medium that captures dust in the air and includes a main collection layer 30.

The filter medium for the air filter 1 may include an air-permeable support material 10 for imparting self-supportability to the main collection layer 30. The air-permeable support material 10 may be disposed upstream or downstream in the airflow from the main collection layer 30. In the example illustrated in FIG. 1, the air-permeable support material 10 is disposed upstream in the airflow from the main collection layer 30. However, configurations are possible in which the air-permeable support material 10 is disposed both upstream and downstream in the airflow from the main collection layer 30.

Next, specific descriptions are given for the layers and the relationships between the layers.

(2) Main Collection Layer

In the filter medium for the air filter, the main collection layer 30 contributes the most to the collection efficiency, and has a filing rate of 5% to 15%, a thickness of 0.35 mm to 0.70 mm, and a peak in the fiber diameter distribution at less than 10 μm and a peak at 1.0 μm or greater. Here, in the fiber diameter distribution of the main collection layer 30, fibers having a diameter of less than 1.0 μm are defined as fibers having a small fiber diameter, and fibers having a diameter of 1.0 μm or greater are defined as fibers having a large fiber diameter. In the main collection layer 30, the average fiber diameter of the fibers having the small fiber diameter of less than 1.0 μm is from 0.1 μm to less than 0.8 μm, and is preferably from 0.3 μm to less than 0.7 μm. Additionally, in the main collection layer 30, the average fiber diameter of the fibers having the large fiber diameter of 1.0 μm or greater is from 1.2 μm to less than 3.0 μm, and is preferably from 1.3 μm to less than 2.9 μm. Moreover, in the main collection layer 30, the volume ratio of the fibers having the small fiber diameter to the fibers having the large fiber diameter, that is, the fibers having the small fiber diameter: the fibers having the large fiber diameter, is from 30:70 to 80:20, inclusive.

The filing rate of the main collection layer 30 is from 5% to 15% and the thickness of the main collection layer 30 is from 0.35 mm to 0.70 mm. This configuration makes it possible to achieve so-called medium-performance (70% or greater) collection efficiency. It is preferable that the filing rate of the main collection layer 30 is from 5% to 10%.

The thickness of the main collection layer 30 is from 0.35 mm to 0.70 mm and, as such, is configured to be sufficiently thin. As a result of this configuration, even when the air-permeable support material 10 is used with the filter medium for the air filter 1, the overall thickness of the filter medium for the air filter 1 can be sufficiently thin to facilitate the pleating using mountain folds and valley folds.

The fiber diameter distribution of the main collection layer 30 has a peak at less than 1.0 μm and a peak at 1.0 μm or greater.

The main collection layer 30 includes both the fibers having the small fiber diameter of less than 1.0 μm and the fibers having the large fiber diameter of 1.0 μm or greater. Additionally, the average fiber diameter of the fibers having the small fiber diameter is from 0.1 μm to less than 0.8 μm, which is sufficiently fine for capturing particles, and the average fiber diameter of the fibers having the large fiber diameter is from 1.2 μm to less than 3.0 μm, which is sufficiently thick. As such, the fibers having the large fiber diameter can be interposed between the fibers having the small fiber diameter so as to secure the space between the fibers having the small fiber diameter, which makes it easier to secure space for capturing particles. As a result, clogging of the filter medium for the air filter 1 can be reduced and more dust can be captured.

Specifically, with the main collection layer 30, the geometric standard deviation for the fibers having the small fiber diameter having an average fiber diameter of 0.1 μm to less than 0.8 μm is preferably 3.0 or less, and the geometric standard deviation for the fibers having the large fiber diameter having an average fiber diameter of 1.2 μm to less than 3.0 μm is preferably 3.0 or less. Moreover, the volume ratio of the fibers having the small fiber diameter to the fibers having the large fiber diameter, that is, the fibers having the small fiber diameter: the fibers having the large fiber diameter, is from 30:70 to 80:20. This configuration makes it possible to realize, in a well-balanced manner, both the function of capturing particles by the fibers having the small fiber diameter and the function of securing space by the fibers having the large fiber diameter. As a result, it is possible to achieve medium-performance collection efficiency and also extend the life (increase the dust holding capacity) of the air filter.

Note that the main collection layer 30 may be configured such that the volume ratio of the fibers having the small fiber diameter to the fibers having the large fiber diameter is uniform from the upstream side to the downstream side of the airflow. However, in order to extend the life of the filter material for the air filter even more, provided that the ratio of "the fibers having the small fiber diameter to the fibers having the large fiber diameter" is within the range of 30:70 to 80:20, the main collection layer 30 may be configured such that the fibers having the small fiber diameter are sparse on the upstream side of the airflow and dense on the downstream side of the airflow. This configuration results in less likelihood of clogging occurring on the upstream side in the airflow of the main collection layer 30 (early stage clogging on the upstream side is reduced), and enables the space secured by the fibers having the large fiber diameter to be sufficiently used across all regions in the airflow direction, which makes it possible to extend the life of the air filter even more. For example, while not limiting, a configuration is possible in which more of the fibers having the small fiber diameter are present in the downstream half than in the upstream half of the main collection layer 30 in the airflow direction. In this case, whether more of the fibers having the small fiber diameter are present may be ascertained by using an microscope to observe a plurality of arbitrary locations in the upstream half and the downstream half, and counting the number of the fibers having the small fiber diameter that are present per unit volume.

Configurations are possible in which 90 mass % or more or 100 mass % of the main collection layer 30 is composed of one or two or more selected from the group consisting of polypropylene (PP), polybutylene terephthalate (PBT), polyamide (PA), polyethylene terephthalate (PET), and polyethylene (PE). When the main collection layer 30 is primarily composed of these polymers, a sufficiently large tensile elongation can be obtained, and destruction of the filter medium structure can be reduced even when the filter medium for the air filter 1 is subjected to embossing, which makes enables the formation of convexities by embossing.

A pressure drop of the main collection layer 30, when air is passed through the main collection layer 30 at a flow rate of 5.3 cm/sec, is preferably from 25 Pa to 55 Pa: the lower limit can be 30 Pa or more, and the upper limit is more preferably 42 Pa or less.

When air containing NaCl particles with a particle size of 0.4 μm is passed through the main collection layer 30 at the flow rate of 5.3 cm/sec, a collection efficiency of the particles is preferably 70% or greater, and is more preferably 75% or greater. While not limiting, an upper limit of the collection efficiency of the main collection layer 30 is 85% for example.

Furthermore, when air containing polyalphaolefin particles with a number median size of 0.25 μm is continuously blown through the main collection layer 30 at the flow rate of 5.3 cm/sec, and the pressure drop rises exactly by 250 Pa, a dust holding capacity of the polyalphaolefin particles is preferably 5.0 $g/m^2$ or greater, and is more preferably 6.0 $g/m^2$ or greater.

The method for manufacturing the main collection layer 30 including the fibers having the small fiber diameter and the fibers having the large fiber diameter described above is not particularly limited and, for example, may involve the use of a known melt blown method.

Principles of methods for manufacturing nonwoven fabrics using melt blown methods are reported in, for example, U.S. NAVAL RESEARCH LABORATORY (Report No. 5265, Feb. 11, 1959), and are also detailed in Japanese Laid-open Patent Publication No. S50-46972 and the paper titled "Melt Blowing—A One-Step Web Process for New Nonwoven Products" (Vol 56, No. 4, April 1973, Tappi Journal). According to these documents, a nonwoven fabric made from extremely fine fibers having comparatively uniform diameters can be formed by arranging a plurality of nozzles having a constant pore diameter at a constant pitch on a dice tip, and spinning molten polymer discharged from the nozzles in a high-temperature jet stream. The component fiber diameter can be changed as desired by changing the manufacturing conditions of the melt blown method, examples of dominant factors thereof including polymer discharge temperature, discharge amount, and air amount. The fiber diameters of the component fibers are comparatively uniform and, as such, the fiber diameter distribution can be narrowed. Note that a thermal calender roll may be used to compress and reduce the effective diameter of the resulting nonwoven fabric. Moreover, as described in Japanese Patent No. 3753522 for example, in a case in which a nozzle piece having nozzle pores with different diameters within a specific range is used and the spun fiber diameter distribution is changed during melt blowing, it is possible to simultaneously and integrally form, during melt blowing, a nonwoven fabric in which fibers having different diameters are appropriately mixed and dispersed. In manufacturing of the main collection layer 30 described above, for example by using both nozzles with small pores that produce the fibers having the small fiber diameter and nozzles with large pores that produce the fibers having the large fiber diameter, and adjusting the discharge amount of the polymer per unit time, the discharge temperature of the polymer (corresponding to the melt viscosity of polymer), the blowing speed of the heated air, and the like, the fiber diameters can be adjusted, and a nonwoven fabric with a specific geometric mean, geometric standard deviation, and volume ratio can be obtained. However, in cases where providing different densities between the upstream side and the downstream side of the airflow, a configuration such as that described in Japanese Patent No. 5362561 is possible: in this example, two independent systems of nozzles (for the fibers having the small fiber diameter and for the fibers having the large fiber diameter) may be used to change the proportion of the amount of the fibers having the small fiber diameter discharged from the nozzles with small pores and the amount of the fibers having the large fiber diameter discharged from the nozzles with large pores, in melt blowing.

(3) Air-Permeable Support Material

The air-permeable support material 10 is used together with the main collection layer 30, and enables the filter medium for the air filter 1 to be self-supporting in cases where the filter medium for the air filter 1 cannot self-support with the main collection layer 30 alone.

The air-permeable support material 10 may, for example, be disposed upstream in the airflow from the main collection layer 30.

The material and structure of the air-permeable support material 10 are not particularly limited, and examples thereof include nonwoven fabrics, woven fabrics, metal meshes, and resin nets. Among these, nonwoven fabrics having thermal fusibility are preferable from the viewpoints of strength, collectability, flexibility, and workability. The nonwoven fabric is preferably a nonwoven fabric for which a portion or all of the constituent fibers have a core-sheath structure; a two-layer nonwoven fabric including two layers, namely a layer of fibers made from a low melting point material and a layer of fibers made from a high melting point material; or a nonwoven fabric a having thermal-fusible resin coated on a surface thereof. Examples of such nonwoven fabrics include spun bond nonwoven fabrics. It is preferable that the core component of the core-sheath structure nonwoven fabric has a higher melting point than that of the sheath component. Examples of combinations of the materials for the core-sheath structure include PET/PE and high melting point polyester/low melting point polyester. Examples of combinations of the low melting point material/high melting point material of the two-layer nonwoven fabric include PE/PET, PP/PET, PBT/PET, and low melting point PET/high melting point PET. Examples of nonwoven fabrics having the thermal-fusible resin coated on the surface thereof include a PET nonwoven fabric coated with EVA (ethylene vinyl acetate copolymer resin) and a PET nonwoven fabric coated with olefin resin.

The material of the nonwoven fabric is not particularly limited and examples of the materials that may be used include polyolefins (PE, PP, and the like), polyamides, polyesters (PET and the like), aromatic polyamides, and composite materials thereof.

The air-permeable support material 10 can be bonded to the main collection layer 30 by using an anchor effect produced by partially melting the air-permeable support material 10 by heating or melting a hot-melt resin, or by using the adhesion of a reactive adhesive.

For example, the basis weight of the air-permeable support material 10 is preferably from 50 $g/m^2$ to 150 $g/m^2$, and is more preferably from 50 $g/m^2$ to 100 $g/m^2$.

For example, the thickness of the air-permeable support material 10 is preferably 0.6 mm or less, and is more preferably 0.5 mm or less, and may be 0.2 mm or greater.

When compared to the main collection layer 30 described above, the pressure drop, the collection efficiency, and the dust holding capacity of the air-permeable support material 10 may be extremely low, or may be values that can be considered to be substantially 0.

For example, the pressure drop in the air-permeable support material 10, when air is passed through the air-permeable support material 10 at the flow rate of 5.3 cm/sec, is preferably 10 Pa or less, is more preferably 5 Pa or less, and even more preferably is 1 Pa or less.

For example, when the air containing NaCl particles with the particle size of 0.4 μm is passed through the air-permeable support material 10 at the flow rate of 5.3 cm/sec, the collection efficiency of the particles is substantially 0, and may be the values that can be considered to be about 0.

(4) Overall Filter Medium

An overall tensile elongation of the filter medium for the air filter 1 is 10% or greater. The tensile elongation of the filter medium for the air filter 1 is greater than the tensile elongation of glass fiber, which is about 1%. As a result, the fibers of the filter medium for the air filter 1 are less likely to be destroyed, even when embossed to form convexities.

For example, an overall thickness of the filter medium for the air filter 1 is preferably 1.5 mm or less, is more preferably 1.2 mm or less, is even more preferably 1.1 mm or less, and is yet even more preferably 1.0 mm or less, and may be 0.3 mm or greater. As a result of this configuration, the filter medium for the air filter 1 overall can be configured to be thin to facilitate the pleating using mountain folds and valley folds.

Note that the overall pressure drop and the collection efficiency of the filter medium for the air filter 1 in which the air-permeable support material 10 and the main collection layer 30 are stacked are substantially equivalent to the pressure drop and the collection efficiency of the main collection layer 30. This is because the air-permeable support material 10 substantively does not contribute to the pressure drop and the collection efficiency.

The overall pressure drop, when air is passed through the filter medium for the air filter 1 at the flow rate of 5.3 cm/sec, is preferably from 30 Pa to 55 Pa, and a lower limit thereof may be 35 Pa or greater.

When the air containing NaCl particles with the particle size of 0.4 μm is passed through the filter medium for the air filter 1 at the flow rate of 5.3 cm/sec, the overall collection efficiency of the particle is preferably 70% or greater, and is more preferably 75% or greater. For example, while not limiting, the upper limit of the overall collection efficiency of the filter medium for the air filter 1 is 85%.

An overall PF value of the filter medium for the air filter 1 is preferably from 12 to 18, and is more preferably from 14 to 18.

When the air containing polyalphaolefin particles with the number median size of 0.25 μm is continuously blown through the filter medium for the air filter 1 at the flow rate of 5.3 cm/sec, and the pressure drop rises exactly by 250 Pa, the overall dust holding capacity of the polyalphaolefin particles is preferably 5.0 g/m$^2$ or greater, and is more preferably 6.0 g/m$^2$ or greater, from the viewpoint that such a configuration will make it possible to achieve a dust holding capacity equivalent to or greater than the dust holding capacity of glass filter media composed of typical glass fibers, and also extend the life of the filter medium for the air filter 1. In particular, the overall dust holding capacity of the filter medium for the air filter 1 is more preferably 6.6 g/m$^2$ or greater, from the viewpoint that such a configuration is advantageous from the perspective of ensuring a dust holding capacity not of typical glass filter media, but rather a dust holding capacity equivalent to that of glass filter media for which the glass fiber diameter is provided with two fiber diameter peaks, namely a peak for small fiber diameters for which the geometric mean is about 0.5 μm and a peak for large fiber diameters for which the geometric mean is about 1.1 (see Comparative Example of glass filter medium). For example, while not limiting, an upper limit of the overall dust holding capacity of the filter medium for the air filter 1 is 15.0 g/m$^2$.

(5) Modification Example

A modification example of the filter medium for the air filter 1 of one or more embodiments will be described with reference to FIG. 2.

In the filter medium for the air filter 1 described above, an example was primarily described for a filter medium with a two-layer structure including, in order from the upstream side of the airflow, the optional air-permeable support material 10 and the main collection layer 30.

Figure 2:
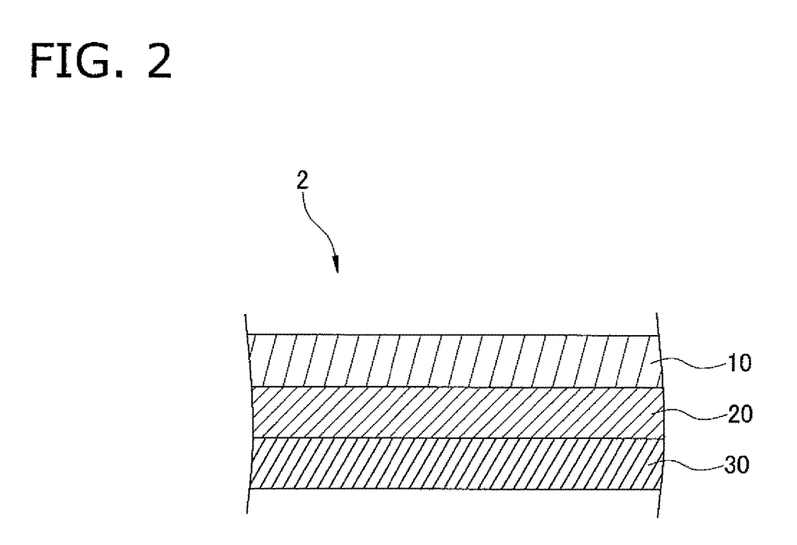
FIG. 2 is a schematic cross-sectional view illustrating the layer structure of the filter medium for the air filter according to a modification example.

However, as illustrated in FIG. 2, for example, a filter medium for an air filter 2 with a three-layer structure may be configured.

The filter medium for the air filter 2 includes a main collection layer 30 and an upstream collection layer 20 similar to those in the filter medium for the air filter 1. The upstream collection layer 20 is disposed upstream in the airflow from the main collection layer 30. As with the filter medium for the air filter 1, the filter medium for an air filter 2 may optionally be provided with the air-permeable support material 10. The air-permeable support material 10 may be disposed farthest upstream in the airflow, between the main collection layer 30 and the upstream collection layer 20, or farthest downstream in the airflow. In the filter medium for the air filter 2 illustrated in FIG. 2, the air-permeable support material 10 is disposed farthest upstream in the airflow.

The physical properties of the main collection layer 30 of the filter medium for the air filter 2 are the same as the physical properties of the main collection layer 30 of the filter medium for the air filter 1, with the exception of the thickness of the main collection layer 30 of the filter medium for the air filter 2 being from 0.26 mm to 0.56 mm. With the filter medium for the air filter 2, a portion of the particles can be captured by the upstream collection layer 20, which is upstream from the main collection layer 30. As such, the burden placed on the main collection layer 30 to achieve medium-performance collection efficiency is lightened, which allows reduction in thickness of the main collection layer 30. Additionally, the main collection layer 30 of the filter medium for the air filter 2 is formed thin enough so that the pleating using mountain folds and valley folds can be easily performed on the main collection layer 30, even when the air-permeable support material 10 is used together with the main collection layer 30 that is located on the upstream collection layer 20.

When the air containing NaCl particles with the particle size of 0.4 μm is passed through the upstream collection layer 20 at the flow rate of 5.3 cm/sec, the collection efficiency of the particle is from 5% to 50%, and is more preferably from 10% to 50%. A too low collection efficiency of the upstream collection layer 20 increases the collection burden placed on the main collection layer 30, and dust clogging occurs at an early stage. A too high collection efficiency of the upstream collection layer 20 causes unignorable clogging in the upstream collection layer 20, and, as expected, clogging occurs at an early stage.

A thickness of the upstream collection layer 20 is from 0.15 mm to 0.45 mm. The thickness of the upstream collection layer 20 exceeding 0.45 mm increases a pressure drop caused by the structure of an air filter unit 60 (structural resistance).

An average fiber diameter of the upstream collection layer 20 is from 1.0 μm to 2.0 μm. If the average fiber diameter is less than 1.0 μm, the collection efficiency rises, but because the fibers is densely disposed, the pressure drop in the upstream collection layer 20 significantly rises. In contrast, if the average fiber diameter is 2.0 μm or greater, increasing the basis weight to maintain the collection efficiency leads to an increase in the thickness of the upstream collection layer 20 and a rise in the pressure drop in the upstream collection layer 20. Note that, in this case, the basis weight of the upstream collection layer 20 is preferably from 5 g/m$^2$ to 50 g/m$^2$. If the fiber diameter is too small, the fibers is spaced densely, and significant clogging occurs in the upstream collection layer 20 itself. However, if the fiber diameter is large, the collection efficiency per unit fiber decreases, which leads to increases in the basis weight and the thickness of the upstream collection layer 20 needed to achieve the desired collection efficiency. As a result, the structural resistance increases, which is not desirable.

The geometric standard deviation of the fiber diameters of the upstream collection layer 20 is preferably 2.5 or less, and more preferably 2.0 or less. This is because an excessively large geometric standard deviation increases the proportion of fibers for which the collection efficiency per unit fiber is low, and the need for an increase in the basis weight and thickness of the upstream collection layer 20 in order to obtain the required collection efficiency.

The pressure drop of the upstream collection layer 20, when air is passed through the upstream collection layer 20 at the flow rate of 5.3 cm/sec, is preferably from 10 Pa to 20 Pa.

While not limiting, the upstream collection layer 20 is preferably a nonwoven fabric or a fiber layer structure composed of a fiber material that is produced through one of a melt blown method, an electrospinning method, and a sea-island method, or a hybrid method thereof. Examples of the hybrid method include a melt spinning method and an electret blown method. In the sea-island method, fibers are formed by discharging raw materials from a plurality of discharge ports. In this case, the raw materials are varied depending on the discharge route: sea portions are formed using some raw materials and island portions are formed using other different raw materials, thus resulting in a cross-section of a sea-island structure. By spinning the sea-island using two-component or multi-component polymers and performing post-treatment in which the sea component is melted, it is possible to leave the island portions in a fiber state. Additionally, bulk density, stretchability, and the like can be adjusted by combining raw materials from desired discharge routes.

While not limiting, examples of the material of the fiber material of the upstream collection layer 20 include polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), polyurethane (PU), and mixtures thereof.

(6) Examples of Usage

The following are examples of uses for the filter medium for the air filter:

Cylinder cartridge filters (for industrial use), filters (for industrial use), filters for vacuum cleaners (for vacuum cleaners), cartridge filter for gas turbines (for compatible products for gas turbines), cooling filters (for electronic equipment cases), and similar fields; and general air-conditioning (for buildings, commercial facilities, schools, and the like), filters for air cleaners and similar fields.

(7) Filter Pack

Next, the filter pack of one or more embodiments will be described with reference to FIG. 3.

Figure 3:
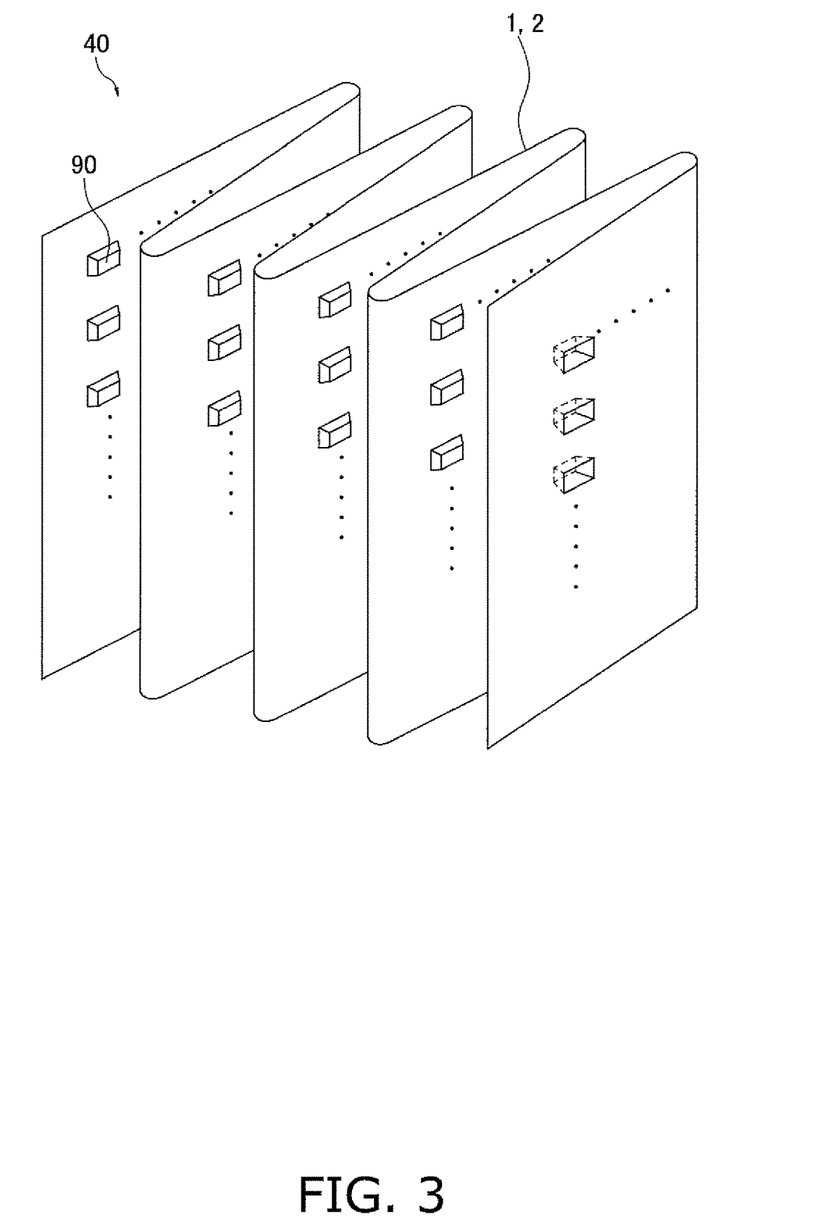
FIG. 3 is a perspective view of the exterior of a filter pack according to one or more embodiments of the present invention.

FIG. 3 is a perspective view of the exterior of a filter pack 40 according to one or more embodiments.

The filter pack 40 includes the filter medium for the air filter described above (e.g. the filter medium for the air filter 1 or the filter medium for the air filter 2). The filter medium for the air filter of the filter pack 40 is a pre-formed filter medium of a zig-zag shape that is formed (pleated) by making alternating mountain folds and valley folds repeatedly. The pleating can be performed with a rotary folding machine for example. A folding width of the filter medium is not particularly limited, but is from 25 mm to 280 mm for example. Providing the filter pack 40 with the pleating enables increased folded area of the filter medium when used in the air filter unit. As a result, the air filter unit with high collection efficiency can be obtained.

Note that, prior to the pleating, the filter medium for the air filter 1 or the filter medium for the air filter 2 is subjected to embossing to form protrusions (convexities) which, when the filter medium is pleated by the mountain folding and valley folding, will be located on each of two adjacent opposing surfaces that face each other. Additionally, the protrusions formed by the embossing may be provided only on one of the two opposing surfaces that face each other. As a result of this configuration, the pleat spaces between the two adjacent opposing surfaces, which face each other when the filter medium for the air filter is pleated, can be maintained due to the protrusions contacting each other, or due to the protrusions on one of the opposing surfaces contacting the surface of the other opposing surface facing the opposing surfaces. The technique for the embossing is not particularly limited but, for example, the embossing is performed by sandwiching and pressing the filter medium between a pair of dies having a plurality of concavo-convexities on the surfaces thereof.

For when used in the air filter unit in addition to the filter medium, the filter pack 40 may be further provided with spacers (not illustrated) to maintain the pleat spaces. The material of the spacers is not particularly limited, but is preferably a hot melt resin.

(8) Air Filter Unit

Next, an air filter unit 60 will be described with reference to FIG. 4.

Figure 4:
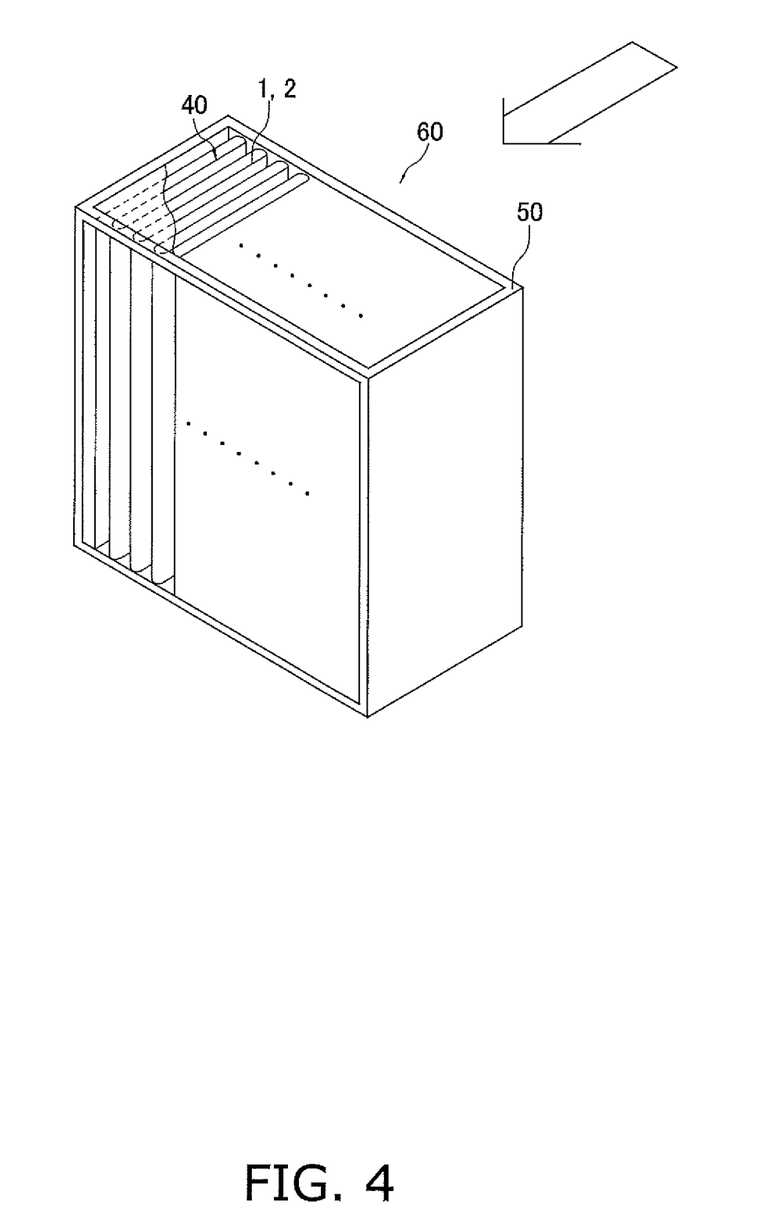
FIG. 4 is a perspective view of the exterior of an air filter unit according to one or more embodiments of the present invention.

FIG. 4 is a perspective view of the exterior of the air filter unit 60 according to one or more embodiments.

The air filter unit 60 includes the filter medium for the air filter or the filter pack described above, and a frame 50 that holds the filter medium for the air filter or the filter pack. In other words, the air filter unit may be fabricated such that the filter medium is held in the frame, or such that the filter pack 40 is held in the frame 50. The air filter unit 60 illustrated in FIG. 4 is fabricated using the filter pack 40 and the frame 50.

For example, the frame 50 is made by assembling plate materials or by molding resin. The filter pack 40 is preferably sealed to the frame 50 using a sealant. The sealant is to prevent leaks between the filter pack 40 and the frame 50, and examples of the sealant include epoxy-based, acrylic-based, urethane-based, and other resin sealants.

The air filter unit 60 including the filter pack 40 and the frame 50 may be a mini-pleated air filter unit in which one flatly extending filter pack 40 is held to be accommodated inside the frame 50, or may be a V-bank air filter unit or a single header air filter unit in which a plurality of flatly extending filter packs are arranged side-by-side and held in the frame.

In contrast, the air filter unit including the filter medium and the frame may be a separator air filter unit in which the filter medium is disposed being folded in an alternating manner into a wave shape and a corrugated separator, for example, is arranged in the valley portions of the alternately folded filter medium.

(9) Method for Manufacturing Filter Medium for Air Filter

Next, a method for manufacturing the filter medium for the air filter of one or more embodiments will be described.

The method for stacking the layers of the filter medium for the air filter 1, which has the two-layer structure illustrated in FIG. 1, is not particularly limited. For example, the air-permeable support material 10 can be integrated with the main collection layer 30 by using the anchor effect produced by partially melting the main collection layer 30 by heating or melting the hot melt resin, or using the adhesion of a reactive adhesive or the like.

Additionally, the method for stacking the layers of the filter medium for the air filter 2, which has the three-layer structure illustrated in FIG. 2, is not particularly limited. For example, the main collection layer 30, the upstream collection layer 20, and the air-permeable support material 10 can be integrated by using the anchor effect produced by partially melting the main collection layer 30 and/or the upstream collection layer 20 or melting the hot melt resin by heating, or using the adhesion of the reactive adhesive or the like.

(10) Definitions of Parameters and Methods for Measuring the Parameters

Next, definitions of and methods for measuring each of the parameters will be described.

(Basis Weight)

The basis weight was a value obtained by a cutting a sample to a 4.0 cm×12.0 cm rectangle, measuring the mass thereof using a precision scale, and dividing the mass (g) by the area (0.0048 m$^2$) thereof.

(Fiber Filing Rate)

The fiber filing rate of the filter medium was found using the following equation:

Fiber filing rate(%)=(basis weight of filter medium)/ (thickness of filter medium)/(specific gravity of raw material)×100

(Average Fiber Diameter and Geometric Standard Deviation of Fiber Diameters)

An electron micrograph was captured at 5000-times magnification using a scanning electron microscope (SU8020, manufactured by HITACHI Ltd.). An arbitrary 25 µm×20 µm region in this electron micrograph was observed and longitudinal and transverse straight lines orthogonal to each other were drawn. Diameters of all the fibers crossing each straight line were measured using a ruler and scalarly converted to find the fiber diameters (nm). Next, the cumulative frequency distribution of the obtained fiber diameters was log-normal plotted on logarithmic probability paper with the fiber diameter on the horizontal axis and the cumulative frequency on the vertical axis. The value where the cumulative frequency was 50% was defined as the average fiber diameter (median diameter). The geometric standard deviation representing the distribution of the fiber diameter was obtained by reading the fiber diameter at 50% cumulative frequency and the fiber diameter at 84% cumulative frequency from the results of the log-normal plotting described above, and calculating in accordance with the following equation: Geometric standard deviation [–]=fiber diameter at 84% cumulative frequency/fiber diameter at 50% cumulative frequency (Space Between Fibers)

Space between fibers as a parameter indicating the ease of clogging of the air filter was calculated in accordance with the following equation:

Space between fibers (µm)=$d_{50}(\sqrt{(\pi/4\alpha)}-1)$ $d_{50}$=Average fiber diameter (µm)
$\alpha$=Filing Rate (–)
$\pi$=Pi (Pressure Drop)

A measurement sample of the filter medium was set in a filter holder having an inner diameter of 113 mm (effective filter medium area: 100 cm$^2$), and the flow of air passing through the filter medium was adjusted to 5.3 cm/sec using a flowmeter. Then, the pressure drops at that time occurring upstream and downstream from the sample filter medium were measured using a manometer.

(Collection Efficiency of NaCl Particles Having Particle Size of 0.4 µm)

According to the method described in the NaCl aerosol generating method (pressurized spray method) of JIS B9928, Appendix 5 (Provisions), NaCl particles generated by an atomizer were classified to monodispersed particles having the particle size of 0.4 µm using an electrostatic classifier (3071A, manufactured by TSI Inc.). Then, the resulting NaCl particles were passed over americium 241, which is an alpha radiation source, to change the charged state of the particles to an equilibrium charged state identical to that of atmospheric dust. A measurement sample, namely the filter medium, was set in the same filter holder used when measuring the pressure drop. Then, the NaCl particles having the particle size of 0.4 µm were introduced upstream from the filter medium, and air containing these particles was passed through the filter medium at the flow rate of 5.3 cm/sec. The number of particles upstream and downstream at this time was measured using a condensation particle counter (3022A, manufactured by TSI Inc.). The collection efficiency was calculated using the following equation:

Collection efficiency(%)=(1−(CO/CI))×100

CO=Number of 0.4 µm NaCl particles on downstream side
CI=Number of 0.4 µm NaCl particles on upstream side (PF Value)

The PF value was calculated from the pressure drop and the collection efficiency (the collection efficiency of NaCl particles having a particle size of 0.4 µm) of the filter medium using the following equation. The PF value has been conventionally used as an indicator of the magnitude of the collection performance of filter media for air filters, and better performance results in larger PF values.

PF value={−log((100−collection efficiency (%))/100)}/(pressure drop (Pa)/1000)

Note that the value of (100−collection efficiency (%)) is what is known as permeability (%).
(Dust Holding Capacity)
According to the method described in the NaCl aerosol generating method (pressurized spray method) of JIS B9928, Appendix 5 (Provisions), NaCl particles generated by an atomizer were passed over americium 241, which is an alpha radiation source, to change the charged state of the particles to an equilibrium charged state identical to that of atmospheric dust. A measurement sample, namely the filter medium, was set in the same filter holder used when measuring the pressure drop. Then, the NaCl particles were introduced upstream from the filter medium. Loading of the NaCl particles was continued until the pressure drop of the filter increased by +250 Pa from an initial value. Using the following equation, the dust holding capacity was calculated from weight measurements of the filter medium before and after the NaCl particle loading.

Dust holding capacity $(g/m^2)=(MI-MO)/A$

MO=Weight (g) of test filter medium before NaCl particle loading
MI=Weight (g) of test filter medium after NaCl particle loading
A=Effective area of filter medium (100 $cm^2$=0.01 $m^2$)
(Thickness)
An ABS digimatic indicator (ID-C112CX, manufactured by Mitutoyo Corp.) was fixed to a gauge stand, and the thickness value when a load of 0.3 N was applied to the measurement subject was read.
Note that pressure is applied to the air-permeable support material 10, the main collection layer 30, and the upstream collection layer 20 and, as such, the thickness of the filter medium for the air filter resulting from bonding the layers together is not simply the sum of the thicknesses of the layers, but rather falls in a range of 85% to 100% and more specifically in a range of 87% to 95% of the simple sum of the thicknesses of the layers.
(Tensile Elongation)
Tensile elongation was calculated according to the test method for elongation (ISO method) described in JIS L 1913 (2010). In this case, the test method was based on ISO 9073-3. A constant speed extension type tensile testing machine was used which had the accuracy stipulated in JIS B 7721 and was equipped with a device capable of automatically recording the load and the grip interval. First, five test pieces were collected from the sample in each of the vertical direction and the horizontal direction at evenly separated positions located 100 mm or more from the edge of the sample. The test pieces had a width of 50±0.5 mm, and a length that allowed a grip interval of 200 mm (e.g. 300 mm). Next, each test piece was attached to the tensile testing machine at an initial load with a grip interval of 200±1 mm. Note that the initial load was a state in which the test piece was pulled by hand such that there was no sagging. The test piece was stretched at tensile rate of 100±10 mm/min, and a load was applied until the test piece failed. The strength of the test piece at maximum load was measured to 0.1 N, and the elongation at maximum load was measured to 1 mm. The elongation percentage was measured from this stretching. Average values of elongation percentage were calculated for each of the vertical direction and the horizontal direction, and a value obtained by rounding the average thereof to the nearest 0.5% was defined as the tensile elongation.

EXAMPLES

Hereinafter, embodiments of the present invention are described in detail using examples, comparative examples, and reference examples.

It should be noted that the examples, comparative examples, and reference examples described herein all pertain to the filter medium for an air filter 1 and the physical properties thereof, and do not pertain to the filter pack 40 obtained by making mountain folds and valley folds in the filter medium for an air filter 1, the air filter unit 60, or to the physical properties (pressure drop) thereof.

Examples 1, 3, 4, 7-10 and Comparative Examples 1, 2, 4-12

As for the filter medium for an air filter 1 having the two-layer structure illustrated in FIG. 1, the air-permeable support material 10 and the main collection layer 30 having the physical properties shown in Table 1 were bonded by thermal fusion using a laminating apparatus, to obtain the filter medium for an air filter for each of Examples 1, 3, 4, and 7-10.
The main collection layers of Examples 3 and 4 are examples in which the volume ratio of the fibers having the small fiber diameter to the fibers having the large fiber diameter was mainly changed according to Example 1.
The main collection layer of Example 7 was an example in which the filing rate was mainly reduced according to Example 1.
The main collection layer of Example 8 is an example in which the filing rate was mainly increased according to Example 1.
The main collection layer of Example 9 is an example in which the average fiber diameter of the fibers having the small fiber diameter was mainly increased on the basis of Example 1.
The main collection layer of Example 10 is an example in which the average fiber diameter of the fibers having the large fiber diameter was mainly increased on the basis of Example 1.
Comparative Example 1 is an example in which the main collection layer included only the fibers having the small fiber diameter, and the fibers having the large fiber diameter were not provided.
Comparative Example 2 is an example in which there was only one peak in the fiber diameters, and the main collection layer was composed of fibers having an average fiber diameter between the large fiber diameter and the small fiber diameter.
Comparative Example 3 is an example of a glass filter medium that was composed of glass fibers including fibers having a small fiber diameter and fibers having a large fiber diameter.
The main collection layers of Comparative Examples 4 and 5 are examples in which the geometric mean of the fibers having the small fiber diameter was mainly changed on the basis of Example 1. Note that, in Comparative Examples 4 and 5, the thickness of the main collection layer was adjusted to obtain a medium-performance collection efficiency for the overall collection efficiency of the filter medium for an air filter.
The main collection layer of Comparative Example 6 is an example in which the geometric mean of the fibers having the small fiber diameter was mainly changed on the basis of Example 1. Note that, in Comparative Example 6, a main collection layer for which the geometric mean of the fibers having the small fiber diameter was similar to that in Comparative Example 4 was used, but the thickness of the main collection layer was not adjusted (was the same as in Example 1) to obtain a medium-performance collection efficiency.

The main collection layer of Comparative Example 7 is an example in which that the geometric mean of the fibers having the small fiber diameter and the volume ratio of the fibers having the small fiber diameter to the fibers having the large fiber diameter were mainly changed on the basis of Example 1.

The main collection layer of Comparative Example 8 is an example in which the geometric mean of the fibers having the small fiber diameter and the geometric mean of the fibers having the large fiber diameter were each increased mainly on the basis of Example 1.

The main collection layer of Comparative Example 9 is an example in which that the geometric mean of the fibers having the small fiber diameter and the geometric mean of the fibers having the large fiber diameter were each decreased mainly on the basis of Example 1.

The main collection layer of Comparative Example 10 is an example in which the volume ratio of the fibers having the large fiber diameter was increased to reduce the pressure drop, as compared to that Comparative Example 9.

The main collection layer of Comparative Example 11 is an example in which the filing rate and the thickness were both reduced to further reduce the pressure drop, as compared to those of Comparative Example 10.

The main collection layer of Comparative Example 12 is an example in which the filing rate was mainly reduced on the basis of Example 1.

Examples 2, 5, 6, 11 and Comparative Example 13

As for the filter medium for an air filter 2 having the three-layer structure illustrated in FIG. 2, the air-permeable support material 10, the main collection layer 30, and the upstream collection layer 20 having the physical properties shown in Table 1 were bonded by thermal fusion using a laminating apparatus, to obtain the filter medium for an air filter for each of Examples 2, 5, 6, and 11, and Comparative Example 13.

Example 5 is an example in which the collection efficiency of the upstream collection layer was mainly reduced according to Example 2.

Example 6 is an example in which the collection efficiency of the upstream collection layer was mainly increased according to Example 2.

Example 11 is an example in which the collection efficiency of the upstream collection layer was further reduced as compared to that in Example 5.

Comparative Example 13 is an example in which the collection efficiency of the upstream collection layer was mainly significantly increased according to Example 2.

Note that, as for the "air-permeable support material" included in Examples and Comparative Examples, a commercially available nonwoven fabric made 100% from polyester and obtained by thermal bonding was used as the air-permeable support material.

Additionally, as for the "upstream collection layer" included in Examples and Comparative Examples, an upstream collection layer made 100% from polypropylene and at a melt flow rate (MFR) of 800 g/10 min was used.

Furthermore, as for the "main collection layer," a main collection layer made 100% from polypropylene was used. Fiber with high fluidity (MFR 1800 g/10 min) was used for the fibers having the small fiber diameter included in the main collection layer. Fiber with low fluidity (MFR 800 g/10 min) was used for the fibers having the large fiber diameter included in the main collection layer. The thickness of the fiber diameter can be adjusted by changing the discharge amount of the resin, the speed of the air, and the temperature of the air.

Note that the value of the melt flow rate (MFR) of the polypropylene is obtained by measuring in accordance with ASTM D-1238 at a temperature of 230° C. and under a load of 2.16 kg.

In Tables 1 to 6, measurements of the filter medium for an air filter (the article prior to being formed into a filter pack or an air filter unit) for each of Examples and Comparative Examples are shown together with the physical properties of the materials used to fabricate each filter medium for an air filter.

TABLE 1

| | Contents | | Example 1 | Example 2 | Example 3 | Example 4 |
|---|---|---|---|---|---|---|
| Air-permeable support material | Basis weight (g/m$^2$) | | 79 | 79 | 79 | 79 |
| | Average fiber diameter (μm) | | 20.00 | 20.00 | 20.00 | 20.00 |
| | Thickness (μm) | | 400 | 400 | 400 | 400 |
| | Collection efficiency (%) (0.4 μm particles) | | 0 | 0 | 0 | 0 |
| | Pressure drop (Pa) | | 0 | 0 | 0 | 0 |
| Upstream collection layer | Basis weight (g/m$^2$) | | — | 30.0 | — | — |
| | Average fiber diameter (μm) | | — | 1.55 | — | — |
| | Thickness (μm) | | — | 263 | — | — |
| | Collection efficiency (%) (0.4 μm particles) | | — | 30.0 | — | — |
| | Pressure drop (Pa) | | — | 11.0 | — | — |
| Main collection layer | Basis weight (g/m$^2$) | | 28.8 | 21.6 | 25.2 | 46.8 |
| | Fiber filing rate (%) | | 8 | 8 | 8 | 8 |
| | Fiber diameter distribution (small fiber diameter side) | Ave. fiber diameter (μm) | 0.37 | 0.37 | 0.37 | 0.37 |
| | | Geometric std. deviation | 2.00 | 2.00 | 2.00 | 2.00 |
| | | Space between fibers (μm) | 1.71 | 1.71 | 1.71 | 1.71 |
| | | Mixture volume ratio (%) | 50 | 50 | 80 | 40 |
| | Fiber diameter distribution (large fiber diameter side) | Ave. fiber diameter (μm) | 1.71 | 1.71 | 1.71 | 1.71 |
| | | Geometric std. deviation | 2.00 | 2.00 | 2.00 | 2.00 |
| | | Space between fibers (μm) | 5.87 | 5.87 | 5.87 | 5.87 |
| | | Mixture volume ratio (%) | 50 | 50 | 20 | 60 |
| | Thickness (μm) | | 400 | 300 | 350 | 650 |
| | Collection efficiency (%) (0.4 μm particles) | | 75.2 | 69.3 | 77.4 | 76.8 |
| | Pressure drop (Pa) | | 38.1 | 32.0 | 35.9 | 41.0 |
| Overall filter material | Tensile elongation (%) | | 27.3 | 17.9 | 21.5 | 27.3 |
| | Basis weight (g/m$^2$) | | 111 | 104 | 107 | 129 |
| | Thickness (μm) | | 720 | 860 | 680 | 900 |

TABLE 1-continued

| Contents | Example 1 | Example 2 | Example 3 | Example 4 |
|---|---|---|---|---|
| Collection efficiency (%) (0.4 μm particles) | 75.2 | 75.5 | 77.4 | 76.8 |
| Pressure drop (Pa) | 38.1 | 43.0 | 35.9 | 41.0 |
| PF value | 15.9 | 14.2 | 18.0 | 15.5 |
| NaCl dust holding capacity (at +250 Pa over initial) (g/m2) | 6.9 | 14.4 | 6.6 | 7.3 |

TABLE 2

| | Contents | Example 5 | Example 6 | Example 7 | Example 8 |
|---|---|---|---|---|---|
| Air-permeable support material | Basis weight (g/m$^2$) | 79 | 79 | 79 | 79 |
| | Average fiber diameter (μm) | 20.00 | 20.00 | 20.00 | 20.00 |
| | Thickness (μm) | 400 | 400 | 400 | 400 |
| | Collection efficiency (%) (0.4 μm particles) | 0 | 0 | 0 | 0 |
| | Pressure drop (Pa) | 0 | 0 | 0 | 0 |
| Upstream collection layer | Basis weight (g/m$^2$) | 36.0 | 40.5 | — | — |
| | Average fiber diameter (μm) | 1.40 | 1.00 | — | — |
| | Thickness (μm) | 400 | 450 | — | — |
| | Collection efficiency (%) (0.4 μm particles) | 20.9 | 49.2 | — | — |
| | Pressure drop (Pa) | 16.3 | 33.3 | — | — |
| Main collection layer | Basis weight (g/m$^2$) | 28.8 | 15.8 | 42.8 | 54.0 |
| | Fiber filing rate (%) | 8 | 5 | 7 | 15 |
| | Fiber diameter distribution (small fiber diameter side) Ave. fiber diameter (μm) | 0.37 | 0.37 | 0.37 | 0.37 |
| | Geometric std. deviation | 2.00 | 2.00 | 2.00 | 2.00 |
| | Space between fibers (μm) | 1.71 | 1.71 | 1.71 | 1.71 |
| | Mixture volume ratio (%) | 80 | 40 | 80 | 70 |
| | Fiber diameter distribution (large fiber diameter side) Ave. fiber diameter (μm) | 1.71 | 1.71 | 1.71 | 1.71 |
| | Geometric std. deviation | 2.00 | 2.00 | 2.00 | 2.00 |
| | Space between fibers (μm) | 5.87 | 5.87 | 5.87 | 5.87 |
| | Mixture volume ratio (%) | 20 | 60 | 20 | 30 |
| | Thickness (μm) | 400 | 350 | 680 | 400 |
| | Collection efficiency (%) (0.4 μm particles) | 69.8 | 51.3 | 75.9 | 78.0 |
| | Pressure drop (Pa) | 33.9 | 21.0 | 40.6 | 52.7 |
| Overall filter material | Tensile elongation (%) | 27.3 | 27.3 | 15.3 | 27.3 |
| | Basis weight (g/m2) | 111 | 98 | 125 | 136 |
| | Thickness (μm) | 1020 | 1080 | 920 | 720 |
| | Collection efficiency (%) (0.4 μm particles) | 76.3 | 75.3 | 75.9 | 78.0 |
| | Pressure drop (Pa) | 51.3 | 54.3 | 40.6 | 52.7 |
| | PF value | 12.2 | 11.2 | 15.2 | 12.5 |
| | NaCl dust holding capacity (at +250 Pa over initial) (g/m$^2$) | 9.6 | 15.6 | 6.4 | 6.7 |

TABLE 3

| | Contents | Example 9 | Example 10 | Example 11 | Comparative. Example 1 |
|---|---|---|---|---|---|
| Air-permeable support material | Basis weight (g/m$^2$) | 79 | 79 | 79 | 79 |
| | Average fiber diameter (μm) | 20.00 | 20.00 | 20.00 | 20.00 |
| | Thickness (μm) | 400 | 400 | 400 | 400 |
| | Collection efficiency (%) (0.4 μm particles) | 0 | 0 | 0 | 0 |
| | Pressure drop (Pa) | 0 | 0 | 0 | 0 |
| Upstream collection layer | Basis weight (g/m$^2$) | — | — | 40.5 | — |
| | Average fiber diameter (μm) | — | — | 1.7 | — |
| | Thickness (μm) | — | — | 450 | — |
| | Collection efficiency (%) (0.4 μm particles) | — | — | 15.9 | — |
| | Pressure drop (Pa) | — | — | 18.9 | — |
| Main collection layer | Basis weight (g/m$^2$) | 27.0 | 18.9 | 25.2 | 4.2 |
| | Fiber filing rate (%) | 5 | 6 | 8 | 10.6 |
| | Fiber diameter distribution (small fiber diameter side) Ave. fiber diameter (μm) | 0.60 | 0.37 | 0.37 | 0.37 |
| | Geometric std. deviation | 2.00 | 2.00 | 2.00 | 2.20 |
| | Space between fibers (μm) | 1.71 | 1.71 | 1.71 | 0.67 |
| | Mixture volume ratio (%) | 70 | 50 | 80 | 100 |
| | Fiber diameter distribution (large fiber diameter side) Ave. fiber diameter (μm) | 1.71 | 2.80 | 1.71 | — |
| | Geometric std. deviation | 2.00 | 2.00 | 2.00 | — |
| | Space between fibers (μm) | 5.87 | 11.53 | 5.87 | — |
| | Mixture volume ratio (%) | 30 | 50 | 20 | — |

TABLE 3-continued

|  | Contents | Example 9 | Example 10 | Example 11 | Comparative. Example 1 |
|---|---|---|---|---|---|
| Overall filter material | Thickness (μm) | 600 | 350 | 350 | 42 |
|  | Collection efficiency (%) (0.4 μm particles) | 75.3 | 77.7 | 77.4 | 75.0 |
|  | Pressure drop (Pa) | 54.7 | 51.9 | 35.9 | 35.4 |
|  | Tensile elongation (%) | 27.3 | 27.3 | 27.3 | 10.5 |
|  | Basis weight (g/m$^2$) | 109 | 101 | 107 | 83 |
|  | Thickness (μm) | 900 | 680 | 1080 | 440 |
|  | Collection efficiency (%) (0.4 μm particles) | 75.3 | 77.7 | 81.0 | 75.0 |
|  | Pressure drop (Pa) | 54.7 | 51.9 | 54.8 | 35.4 |
|  | PF value | 11.1 | 12.6 | 13.2 | 17.0 |
|  | NaCl dust holding capacity (at +250 Pa over initial) (g/m$^2$) | 9.3 | 8.3 | 7.6 | 3.5 |

TABLE 4

|  | Contents | Comparative. Example 2 | Comparative. Example 3 | Comparative. Example 4 | Comparative. Example 5 |
|---|---|---|---|---|---|
| Air-permeable support material | Basis weight (g/m$^2$) | 79 | — | 79 | 79 |
|  | Average fiber diameter (μm) | 20.00 | — | 20.00 | 20.00 |
|  | Thickness (μm) | 400 | — | 400 | 400 |
|  | Collection efficiency (%) (0.4 μm particles) | 0 | — | 0 | 0 |
|  | Pressure drop (Pa) | 0 | — | 0 | 0 |
| Upstream collection layer | Basis weight (g/m$^2$) | — | — | — | — |
|  | Average fiber diameter (μm) | — | — | — | — |
|  | Thickness (μm) | — | — | — | — |
|  | Collection efficiency (%) (0.4 μm particles) | — | — | — | — |
|  | Pressure drop (Pa) | — | — | — | — |
| Main collection layer | Basis weight (g/m$^2$) | 28.0 | 80 | 108.0 | 9.4 |
|  | Fiber filing rate (%) | 14.5 | 7.9 | 8 | 8 |
|  | Fiber diameter distribution (small fiber diameter side) Ave. fiber diameter (μm) | 0.69 | 0.50 | 1.10 | 0.10 |
|  | Geometric std. deviation | 2.20 | 2.30 | 2.20 | 2.20 |
|  | Space between fibers (μm) | 0.83 | 1.07 | 1.71 | 1.71 |
|  | Mixture volume ratio (%) | 100 | — | 50 | 50 |
|  | Fiber diameter distribution (large fiber diameter side) Ave. fiber diameter (μm) | — | 1.10 | 1.71 | 1.71 |
|  | Geometric std. deviation | — | 2.30 | 2.00 | 2.00 |
|  | Space between fibers (μm) | — | 2.35 | 5.87 | 5.87 |
|  | Mixture volume ratio (%) | — | — | 50 | 50 |
|  | Thickness (μm) | 129 | 480 | 1500 | 130 |
|  | Collection efficiency (%) (0.4 μm particles) | 75.2 | 77 | 81.7 | 82.7 |
|  | Pressure drop (Pa) | 53.8 | 53 | 79.1 | 37.5 |
| Overall filter material | Tensile elongation (%) | 15.0 | 0.6 | 27.3 | 16.0 |
|  | Basis weight (g/m$^2$) | 107 | 80 | 190 | 91 |
|  | Thickness (μm) | 530 | 480 | 1710 | 480 |
|  | Collection efficiency (%) (0.4 μm particles) | 75.2 | 77 | 81.7 | 82.7 |
|  | Pressure drop (Pa) | 53.8 | 53 | 79.1 | 37.5 |
|  | PF value | 11.3 | 12.0 | 9.3 | 20.3 |
|  | NaCl dust holding capacity (at +250 Pa over initial) (g/m$^2$) | 3.8 | 6.6 | 16.4 | 4.2 |

TABLE 5

|  | Contents | Comparative. Example 6 | Comparative. Example 7 | Comparative. Example 8 | Comparative. Example 9 |
|---|---|---|---|---|---|
| Air-permeable support material | Basis weight (g/m$^2$) | 79 | 79 | 79 | 79 |
|  | Average fiber diameter (μm) | 20.00 | 20.00 | 20.00 | 20.00 |
|  | Thickness (μm) | 400 | 400 | 400 | 400 |
|  | Collection efficiency (%) (0.4 μm particles) | 0 | 0 | 0 | 0 |
|  | Pressure drop (Pa) | 0 | 0 | 0 | 0 |
| Upstream collection layer | Basis weight (g/m$^2$) | — | — | — | — |
|  | Average fiber diameter (μm) | — | — | — | — |
|  | Thickness (μm) | — | — | — | — |
|  | Collection efficiency (%) (0.4 μm particles) | — | — | — | — |
|  | Pressure drop (Pa) | — | — | — | — |
| Main collection layer | Basis weight (g/m$^2$) | 28.8 | 50.4 | 28.8 | 22.1 |
|  | Fiber filing rate (%) | 8 | 8 | 8 | 7 |
|  | Fiber diameter distribution (small fiber diameter side) Ave. fiber diameter (μm) | 1.10 | 1.10 | 1.10 | 0.10 |
|  | Geometric std. deviation | 2.20 | 2.00 | 2.00 | 2.00 |

TABLE 5-continued

|  | Contents | Comparative. Example 6 | Comparative. Example 7 | Comparative. Example 8 | Comparative. Example 9 |
|---|---|---|---|---|---|
|  | Space between fibers (μm) | 1.71 | 1.71 | 17.1 | 1.71 |
|  | Mixture volume ratio (%) | 50 | 80 | 50 | 50 |
|  | Fiber diameter distribution Ave. fiber diameter (μm) | 1.71 | 1.71 | 3.00 | 0.90 |
|  | (large fiber diameter side) Geometric std. deviation | 2.00 | 2.00 | 2.00 | 2.00 |
|  | Space between fibers (μm) | 5.87 | 5.87 | 10.29 | 3.09 |
|  | Mixture volume ratio (%) | 50 | 20 | 50 | 50 |
|  | Thickness (μm) | 400 | 700 | 400 | 350 |
|  | Collection efficiency (%) (0.4 μm particles) | 36.4 | 59.1 | 13.7 | 99.8 |
|  | Pressure drop (Pa) | 31.6 | 34.5 | 7.2 | 212.4 |
| Overall filter material | Tensile elongation (%) | 27.3 | 27.3 | 27.3 | 24.9 |
|  | Basis weight (g/m$^2$) | 111 | 132 | 111 | 104 |
|  | Thickness (μm) | 720 | 990 | 720 | 680 |
|  | Collection efficiency (%) (0.4 μm particles) | 36.4 | 59.1 | 13.7 | 99.8 |
|  | Pressure drop (Pa) | 31.6 | 34.5 | 7.2 | 212.4 |
|  | PF value | 6.2 | 11.3 | 8.9 | 12.7 |
|  | NaCl dust holding capacity (at +250 Pa over initial) (g/m$^2$) | 17.2 | 19.4 | 21.1 | 4.8 |

TABLE 6

|  | Contents | Comparative. Example 10 | Comparative. Example 11 | Comparative. Example 12 | Comparative. Example 13 |
|---|---|---|---|---|---|
| Air-permeable support material | Basis weight (g/m$^2$) | 79 | 79 | 79 | 79 |
|  | Average fiber diameter (μm) | 20.00 | 20.00 | 20.00 | 20.00 |
|  | Thickness (μm) | 400 | 400 | 400 | 400 |
|  | Collection efficiency (%) (0.4 μm particles) | 0 | 0 | 0 | 0 |
|  | Pressure drop (Pa) | 0 | 0 | 0 | 0 |
| Upstream collection layer | Basis weight (g/m$^2$) | — | — | — | 54.0 |
|  | Average fiber diameter (μm) | — | — | — | 1.0 |
|  | Thickness (μm) | — | — | — | 600 |
|  | Collection efficiency (%) (0.4 μm particles) | — | — | — | 64.3 |
|  | Pressure drop (Pa) | — | — | — | 114.5 |
| Main collection layer | Basis weight (g/m$^2$) | 22.1 | 9.9 | 12.6 | 15.8 |
|  | Fiber filing rate (%) | 7 | 5 | 2 | 5 |
|  | Fiber diameter distribution Ave. fiber diameter (μm) | 0.10 | 0.10 | 0.37 | 0.37 |
|  | (small fiber diameter side) Geometric std. deviation | 2.00 | 2.00 | 2.00 | 2.00 |
|  | Space between fibers (μm) | 1.71 | 1.71 | 1.71 | 1.71 |
|  | Mixture volume ratio (%) | 30 | 30 | 50 | 30 |
|  | Fiber diameter distribution Ave. fiber diameter (μm) | 0.90 | 0.90 | 1.71 | 1.71 |
|  | (large fiber diameter side) Geometric std. deviation | 2.00 | 2.00 | 2.00 | 2.00 |
|  | Space between fibers (μm) | 3.09 | 3.09 | 5.87 | 5.87 |
|  | Mixture volume ratio (%) | 70 | 70 | 50 | 70 |
|  | Thickness (μm) | 350 | 220 | 700 | 350 |
|  | Collection efficiency (%) (0.4 μm particles) | 97.3 | 79.7 | 67.0 | 47.3 |
|  | Pressure drop (Pa) | 131.0 | 52.9 | 25.3 | 24.5 |
| Overall filter material | Tensile elongation (%) | 27.3 | 27.3 | 27.3 | 27.3 |
|  | Basis weight (g/m$^2$) | 104 | 92 | 95 | 98 |
|  | Thickness (μm) | 680 | 680 | 990 | 1220 |
|  | Collection efficiency (%) (0.4 μm particles) | 97.3 | 79.7 | 67.0 | 81.0 |
|  | Pressure drop (Pa) | 131.0 | 52.9 | 25.3 | 140.1 |
|  | PF value | 12.0 | 13.1 | 19.0 | 5.1 |
|  | NaCl dust holding capacity (at +250 Pa over initial) (g/m$^2$) | 5.1 | 4.7 | 17.6 | 14.2 |

As seen in the Tables, clogging occurred at an early stage and the dust holding capacity was low in Comparative Example 1, in which the main collection layer consisted only of the fibers having the small fiber diameter, and in Comparative Examples 1 and 2, in which there was only one peak in the fiber diameters. In contrast, it is clear that the dust holding capacity could be increased in Examples 1 to 11, in which the main collection layer included the fibers having the small fiber diameter and the fibers having the large fiber diameter at an appropriate balance.

In particular, it is clear that in Examples 1 to 11, even in cases where the filter medium for an air filter was configured so as to be embossable (when configured so as to have a tensile elongation of 10% or greater), dust holding capacity equivalent to or greater than the dust holding capacity of the glass filter medium shown in Comparative Example 3, which was configured from glass fibers including fibers having the small fiber diameter and fibers having the large fiber diameter, was obtained.

It is clear from Examples 3 and 4 that there are no problems in performance even when the mixture volume ratio of the large fiber diameter to the small fiber diameter is increased or decreased compared to Example 1 and the like, provided that the fibers having the small fiber diameter: the fibers having the large fiber diameter that is within the range of 30:70 to 80:20.

It is clear from Examples 7 and 8 there are no problems in performance even when the filing rate of the main collection layer is increased or decreased compared to Example 1 and the like, provided that the filing rate of the main collection layer is within the range of 5% to 15%.

In a comparison of Example 9 with Comparative Example 4 and Comparative Example 6, it is clear that, while there are no problems when the magnitude of the geometric mean of the fibers having the small fiber diameter is appropriate, when the geometric mean of the fibers having the small fiber diameter is too large, the thickness of the main collection layer needed to ensure the medium-performance collection efficiency becomes excessively large (Comparative Example 4), or the medium-performance collection efficiency cannot be obtained (Comparative Example 6).

It is clear from Example 10 that there are no problems in performance even when the magnitude of the geometric mean of the fibers having the large fiber diameter is increased compared to Example 1 and the like, provided that the geometric mean of the fibers having the large fiber diameter is 3.0 µm or less.

Furthermore, it is clear from Comparative Example 5 that clogging at an early stage occurs and the dust holding capacity is reduced as expected, when the geometric mean of the fibers having the small fiber diameter is excessively small.

It is clear from Comparative Example 7 that, when the geometric mean of the fibers having the small fiber diameter is excessively large, the medium-performance collection efficiency cannot be obtained even if the mixture volume ratio of the fibers having the small fiber diameter is high.

It is clear, as expected, from Comparative Example 8 that, when both of the geometric mean of the fibers having the small fiber diameter and the geometric mean of the fibers having the large fiber diameter are excessively large, the medium-performance collection efficiency cannot be obtained.

It is clear from Comparative Example 9 that, when both of the geometric mean of the fibers having the small fiber diameter and the geometric mean of the fibers having the large fiber diameter are excessively small, while the medium-performance collection efficiency can be obtained, the pressure drop becomes too large and clogging at an early stage occurs: as a result, sufficient dust holding capacity cannot be obtained.

It is clear that configuring the mixture volume ratio of the fibers having the small fiber diameter in Comparative Example 10 to be less compared to Comparative Example 9 resulted in Comparative Example 10 having a lower pressure drop compared to Comparative Example 9. Regardless though, the pressure drop is still excessively large, clogging occurs at an early stage, and sufficient dust holding capacity cannot be obtained.

It is clear that configuring the filing rate in the main collection layer in Comparative Example 11 to be less and the thickness to be thinner compared to Comparative Example 10 resulted in Comparative Example 11 having a lower pressure drop compared to Comparative Example 10. Regardless though, sufficient dust holding capacity still cannot be obtained.

Comparative Example 12 shows that, even when the filing rate in the main collection layer is lowest, regardless of the thickness of the main collection layer being sufficient, sufficient collection efficiency cannot be obtained.

Additionally, it is clear from Example 2 that dust holding capacity can be sufficiently increased even when the main collection layer is designed to be thin and a portion of the dust collection load is borne by the upstream collection layer.

It is clear from Examples 3, 4, and 11 that there are no problems in performance even when the collection efficiency of the upstream collection layer is increased or decreased compared to Example 2, provided that the collection efficiency of the upstream collection layer is within the range of 5% to 50%.

Note that, it is clear from Comparative Example 13 that excessively increasing the collection efficiency of the upstream collection layer, compared to Example 2, results in the overall pressure drop of the filter medium becoming excessively large.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Filter medium for an air filter
2 Filter medium for an air filter
10 Air-permeable support material
20 Upstream collection layer
30 Main collection layer
40 Filter pack
50 Frame
60 Air filter unit

CITATION LIST

Patent Literature

Patent Literature 1: Japanese Laid-open Patent Publication No. 2008-04933

The invention claimed is:
1. A filter medium for an air filter, comprising:
a main collection layer, having:
  a filing rate of 5% to 15%;
  a thickness of 0.35 mm to 0.70 mm; and
  a peak at less than 1.0 µm, and a peak at 1.0 µm or greater in a fiber diameter distribution,
the main collection layer, including:
fibers having a small fiber diameter of less than 1.0 µm, with an average fiber diameter of 0.1 µm to less than 0.8 µm; and
fibers having a large fiber diameter of 1.0 µm or greater, with an average fiber diameter of 1.2 µm to less than 3.0 µm,
with a volume ratio of the fibers having the small fiber diameter to the fibers having the large fiber diameter, that is, the fibers having the small fiber diameter: the fibers having the large fiber diameter, being from 30:70 to 80:20, and
the filter medium for an air filter having a tensile elongation of 10% or greater.
2. A filter medium for an air filter, comprising:
an upstream collection layer; and
a main collection layer disposed downstream side of the upstream collection layer in an airflow,
the filter medium for an air filter having a tensile elongation of 10% or greater,
the upstream collection layer having:
when air containing NaCl particles with a particle size of 0.4 µm is passed through the upstream collection layer at a flow rate of 5.3 cm/sec, a collection efficiency of the NaCl particles of 5% to 50%;

a thickness of 0.15 mm to 0.45 mm;
one peak in a fiber diameter distribution; and
an average fiber diameter of 1.0 μm to 2.0 μm,
the main collection layer having:
a filing rate of 5% to 15%;
a thickness of 0.26 mm to 0.56 mm;
a peak at less than 1.0 μm, and a peak at 1.0 μm or greater in a fiber diameter distribution;
the main collection layer, including:
fibers having a small fiber diameter of less than 1.0 μm, with an average fiber diameter of 0.1 μm to less than 0.8 μm; and
fibers having a large fiber diameter of 1.0 μm or greater, with an average fiber diameter of 1.2 μm to 3.0 μm,
with a volume ratio of the fibers having the small fiber diameter to the fibers having the large fiber diameter, that is, the fibers having the small fiber diameter: fibers having the large fiber diameter, being from 30:70 to 80:20.

3. The filter medium for an air filter according to claim 1, wherein:
the fibers having the small fiber diameter has a geometric standard deviation for the diameters of 3.0 or less, and
the fibers having the large fiber diameter has a geometric standard deviation for the diameters of 3.0 or less.

4. The filter medium for an air filter according to claim 1, wherein:
when air is passed through the filter medium for an air filter at a flow rate of 5.3 cm/sec, a pressure drop is from 30 Pa to 55 Pa, and
when air containing NaCl particles with a particle size of 0.4 μm is passed through the filter medium for an air filter at a flow rate of 5.3 cm/sec, a collection efficiency of the NaCl particles is 75% or greater, and
when air containing polyalphaolefin particles with a number median size of 0.25 μm is continuously blown through the filter medium for an air filter at a flow rate of 5.3 cm/sec, and the pressure drop rises by 250 Pa, a dust holding capacity of the polyalphaolefin particles is 5.0 g/m² or greater.

5. The filter medium for an air filter according to claim 1, wherein:
the main collection layer includes at least one selected from the group consisting of polypropylene, polybutylene terephthalate, polyamide, polyethylene terephthalate, and polyethylene.

6. The filter medium for an air filter according to claim 1, wherein:
the main collection layer includes more of the fibers having the small fiber diameter in a downstream side half of the main collection layer than in an upstream side half of the main collection layer in an airflow passing direction.

7. A filter pack, comprising:
the filter medium for an air filter according to claim 1,
the filter medium for an air filter having a plurality of convexities protruding in a thickness direction, and being configured in a zig-zag shape that has alternative repeated mountain folds and valley folds.

8. An air filter unit, comprising:
the filter medium for an air filter according to claim 1; and
a frame holding the filter medium for an air filter or the filter pack.

9. The filter medium for an air filter according to claim 2, wherein:
the fibers having the small fiber diameter has a geometric standard deviation for the diameters of 3.0 or less, and
the fibers having the large fiber diameter has a geometric standard deviation for the diameters of 3.0 or less.

10. The filter medium for an air filter according to claim 2, wherein:
when air is passed through the filter medium for an air filter at a flow rate of 5.3 cm/sec, a pressure drop is from 30 Pa to 55 Pa, and
when air containing NaCl particles with a particle size of 0.4 μm is passed through the filter medium for an air filter at a flow rate of 5.3 cm/sec, a collection efficiency of the NaCl particles is 75% or greater, and
when air containing polyalphaolefin particles with a number median size of 0.25 μm is continuously blown through the filter medium for an air filter at a flow rate of 5.3 cm/sec, and the pressure drop rises by 250 Pa, a dust holding capacity of the polyalphaolefin particles is 5.0 g/m² or greater.

11. The filter medium for an air filter according to claim 2, wherein:
the main collection layer includes at least one selected from the group consisting of polypropylene, polybutylene terephthalate, polyamide, polyethylene terephthalate, and polyethylene.

12. The filter medium for an air filter according to claim 2, wherein:
the main collection layer includes more of the fibers having the small fiber diameter in a downstream side half of the main collection layer than in an upstream side half of the main collection layer in an airflow passing direction.

13. A filter pack, comprising:
the filter medium for an air filter according to claim 2,
the filter medium for an air filter having a plurality of convexities protruding in a thickness direction, and being configured in a zig-zag shape that has alternative repeated mountain folds and valley folds.

14. An air filter unit, comprising:
the filter medium for an air filter according to claim 2; and
a frame holding the filter medium for an air filter or the filter pack.

15. The filter medium for an air filter according to claim 2, wherein:
the upstream collection layer comprises at least one selected from the group consisting of polyethylene (PE), polypropylene (PP), polyethylene terephthalate (PET), polybutylene terephthalate (PBT), polyamide (PA), polyacrylonitrile (PAN), polyvinylidene fluoride (PVDF), polyvinyl alcohol (PVA), and polyurethane (PU).

16. The filter medium for an air filter according to claim 1, further comprising an air-permeable support layer that is disposed upstream of the main collection layer.

17. The filter medium for an air filter according to claim 16, wherein the air-permeable support layer is comprised of at least one selected from the group consisting of polyethylene, polyester, and aromatic polyamide.

* * * * *